(12) United States Patent
Milford

(10) Patent No.: US 8,086,650 B1
(45) Date of Patent: Dec. 27, 2011

(54) METHOD FOR TRANSFORMING AND CONSOLIDATING FIELDS IN LOG RECORDS FROM LOGS GENERATED ON DIFFERENT OPERATING SYSTEMS

(75) Inventor: Robert A. Milford, Marietta, GA (US)

(73) Assignee: Ipswitch, Inc., Lexington, MA (US)

( * ) Notice: Subject to any disclaimer, the term of this patent is extended or adjusted under 35 U.S.C. 154(b) by 725 days.

(21) Appl. No.: 11/982,586

(22) Filed: Nov. 2, 2007

Related U.S. Application Data (60) Provisional application No. 60/934,685, filed on Jun. 15, 2007.

(51) Int. Cl.
G06F 7/00 (2006.01)
G06F 17/30 (2006.01)
(52) U.S. Cl. ............... 707/804; 707/809; 707/810
(58) Field of Classification Search .............. 707/102, 707/803, 804, 809, 810
See application file for complete search history.

(56) References Cited

U.S. PATENT DOCUMENTS

| | | | |
|---|---|---|---|
| 6,199,070 B1 * | 3/2001 | Polo-Wood et al. | 707/202 |
| 6,571,285 B1 * | 5/2003 | Groath et al. | 709/223 |
| 7,155,514 B1 * | 12/2006 | Milford | 709/225 |
| 7,373,552 B2 * | 5/2008 | Bjorsne | 714/37 |
| 7,444,395 B2 * | 10/2008 | Sanghvi et al. | 709/223 |
| 2004/0049693 A1 * | 3/2004 | Douglas | 713/200 |
| 2004/0254919 A1 * | 12/2004 | Giuseppini | 707/3 |
| 2005/0223282 A1 * | 10/2005 | Frey et al. | 714/20 |
| 2007/0156786 A1 * | 7/2007 | May et al. | 707/204 |

OTHER PUBLICATIONS

Brown, Keith. "Security Briefs: Events in Windows Vista", MSDN Magazine. May 2007. (http://msdn.microsoft.com/en-us/magazine/cc163431.aspx#S6).*

* cited by examiner

*Primary Examiner* — Rehana Perveen
*Assistant Examiner* — Mark Hershley
(74) *Attorney, Agent, or Firm* — Lando & Anastasi, LLP

(57) ABSTRACT

An event log translator for reading and translating, when necessary, the event log records from two distinct event log file formats (e.g. EVT and EVTX formats). Moreover, it is a system for consolidating the log records contained in either of the above formats into a common set of fields, which can be displayed to the user of a computer, exported into different formats (e.g. text files, database tables, etc) or consumed by an event log management system.

10 Claims, 13 Drawing Sheets

METHOD FOR TRANSFORMING AND CONSOLIDATING FIELDS IN LOG RECORDS FROM LOGS GENERATED ON DIFFERENT OPERATING SYSTEMS

CROSS-REFERENCE TO RELATED APPLICATION

This application claims the benefit of U.S. Provisional Application No. 60/934,685 filed on Jun. 15, 2007 of which is included herein by reference.

BACKGROUND

In Microsoft Vista and later Microsoft operating systems (e.g. Microsoft Windows Server 2008), numerous aspects of the event logging mechanism have been changed in comparison to prior versions of Microsoft operating systems. Some of these changes introduce problems and difficulties for the network administrator who must manage event logs on computers running Microsoft Vista alongside computers running earlier versions of Microsoft operating systems (e.g. Microsoft NT 4.0, Microsoft Windows 2000, Microsoft Windows 2003). Some of these problems include, but are not limited to:

1.) The inability of saved event log files generated from Microsoft Windows NT, Microsoft Windows 2000, Microsoft Windows XP, and Microsoft Windows 2003 (henceforth referred to as EVT files) to be read using traditional function calls when said function calls are executed on computers running Microsoft Vista.

2.) The inability of Microsoft Vista's new event logging functions to properly retrieve and format key event log record fields (e.g. the Category field and/or Description field) from pre-Vista EVT files in a reliable and consistent fashion.

3.) The fact that key user account data traditionally present in the User field of pre-Vista EVT security log files is not included in the security event log files (henceforth referred to as EVTX files) of Microsoft Windows Vista and later operating systems.

4.) The fact that the traditional event log record types of "Success Audit" and "Failure Audit" are missing in Microsoft Vista EVTX security log files with both types of events being consolidated under a generic "Information" event level.

5) The fact that additional event log record fields, such as the Keyword field and the Opcode field have been added to Microsoft Vista EVTX event log files, so that there is now a difference between the number of fields in EVT event log files and EVTX event log files.

6.) The fact that traditional, well-known event identifier codes present in pre-Microsoft Vista security EVT log files have been transposed and/or eliminated in Microsoft Vista security EVTX files.

Even as network administrators migrate their computers to the newer Microsoft Vista and later operating systems which feature the newer style EVTX format event logs they may need to retain the older style EVT format event logs from older systems, especially if they must do so in order to satisfy various security or compliance regulations according to law. Therefore, it is vital to have a mechanism for reliably reading and, when necessary, transforming the log records contained in these older EVT event log files, even if the computer performing reading and transformation is running on Microsoft Vista or a later operating system.

Similarly, for the purposes of effective event log management, it is crucial that administrators have a mechanism for transforming the new fields and data contained in EVTX format event log records into the field structure of older EVT format event log records. For instance, an administrator may elect to collect log record data from both EVT and EVTX format event logs on her network into a central database, and being able to use a common field structure for both log formats would allow for centralized reporting and analysis during routine review.

It would be desirable to the network administrator to have an event log record rendering and transformation engine that would execute on a Microsoft Vista or later operating system and that could overcome the limitations described above, yet still be able to manage the event logs generated from earlier Microsoft operating systems, and reconstitute the data from both logs into a set of fields common to log files from both operating systems. For those skilled in the art, an event log record rendering and transformation engine can be designed to adapt around the problems mentioned above and reconstitute log records into a common set of fields, regardless of the original event log record format (e.g. EVT or EVTX). Such an engine could then be loaded into the memory of the modules of an event log management apparatus, such as the one mentioned in U.S. Pat. No. 7,155,514, which is incorporated herein by reference, for maximum interoperability when managing event logs generated from different Microsoft operating systems.

SUMMARY

The present invention is an event log translator for reading and translating, when necessary, the event log records from two distinct event log file formats (e.g. EVT and EVTX formats). Moreover, it is a system for consolidating the log records contained in either of the above formats into a common set of fields, which can be displayed to the user of a computer, exported into different formats (e.g. text files, database tables, etc) or consumed by an event log management system.

When taken in conjunction with the accompanying drawings and the appended claims, other features and advantages of the present invention become apparent upon reading the following detailed description of the embodiments of the invention.

BRIEF DESCRIPTION OF THE DRAWINGS

The invention is illustrated in the drawings in which like reference characters designate the same or similar parts throughout the figures of which.

DETAILED DESCRIPTION

Figure 1:
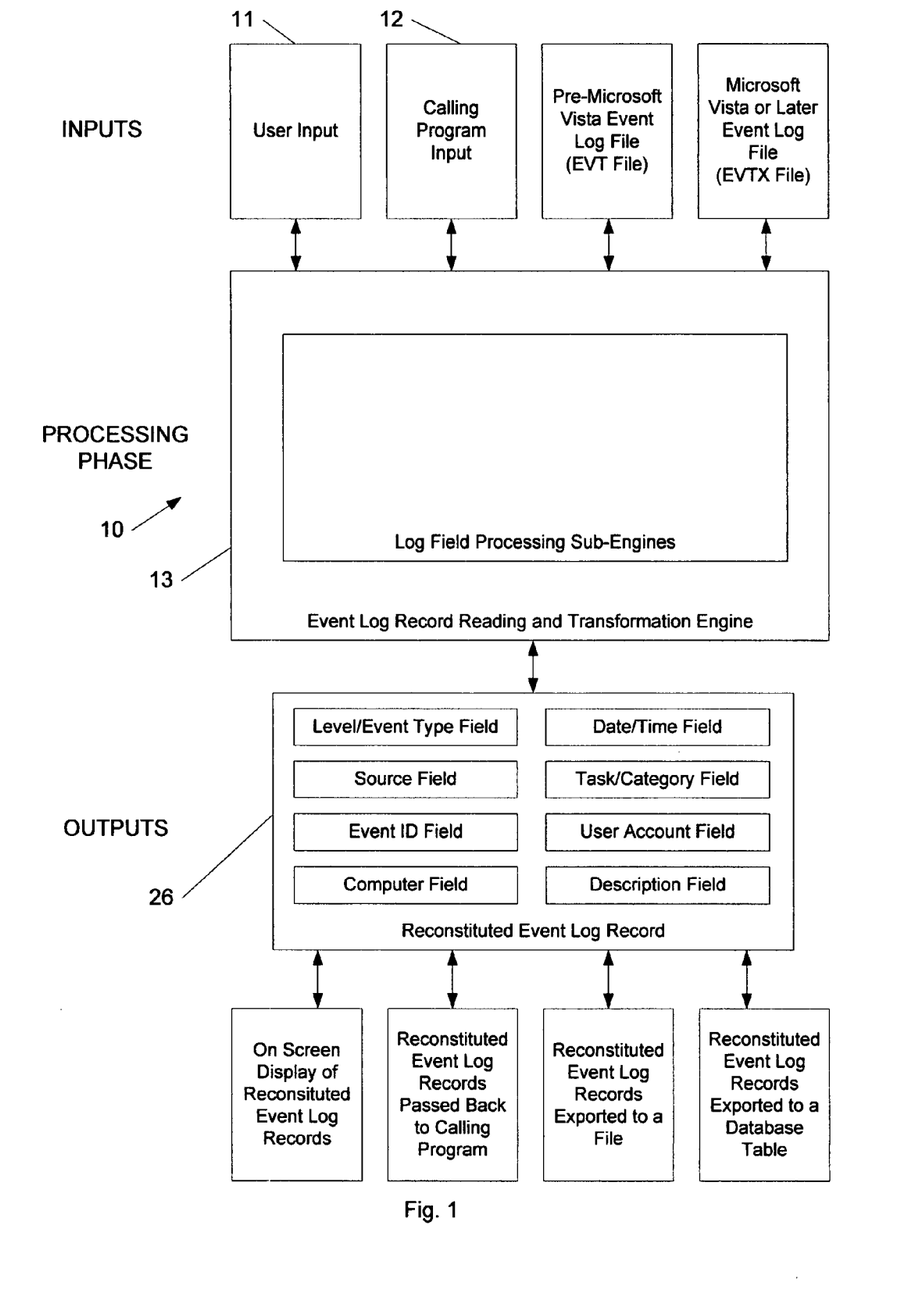
FIG. 1 illustrates a top-level block diagram view of a Event Log Translator of the present invention.

The present invention 10, FIG. 1 is a software engine that translates event log records from event logs generated on different operating systems. When activated, a calling program or user directs via a user input 11 or calling program input 12 an Event Log Record Reading and Transformation Engine 13 to begin loading records from an event log file. The event log file may, if desired, be in the event viewer file format (EVT) or the Vista event viewer (EVTX) format. The Log Format Evaluator 14, FIG. 2a component of the Event Log Record Reading and Transformation Engine 13 determines which format (EVT or EVTX) the target event log file is in by examining both the file extension of the file and the file's header information. Once the format is determined, the Event Log Record Reading and Transformation Engine 13 makes note of which sub-engines must be executed against rendered log record data in order to produce the Reconstituted Event Log Record 26.

Figure 2A:
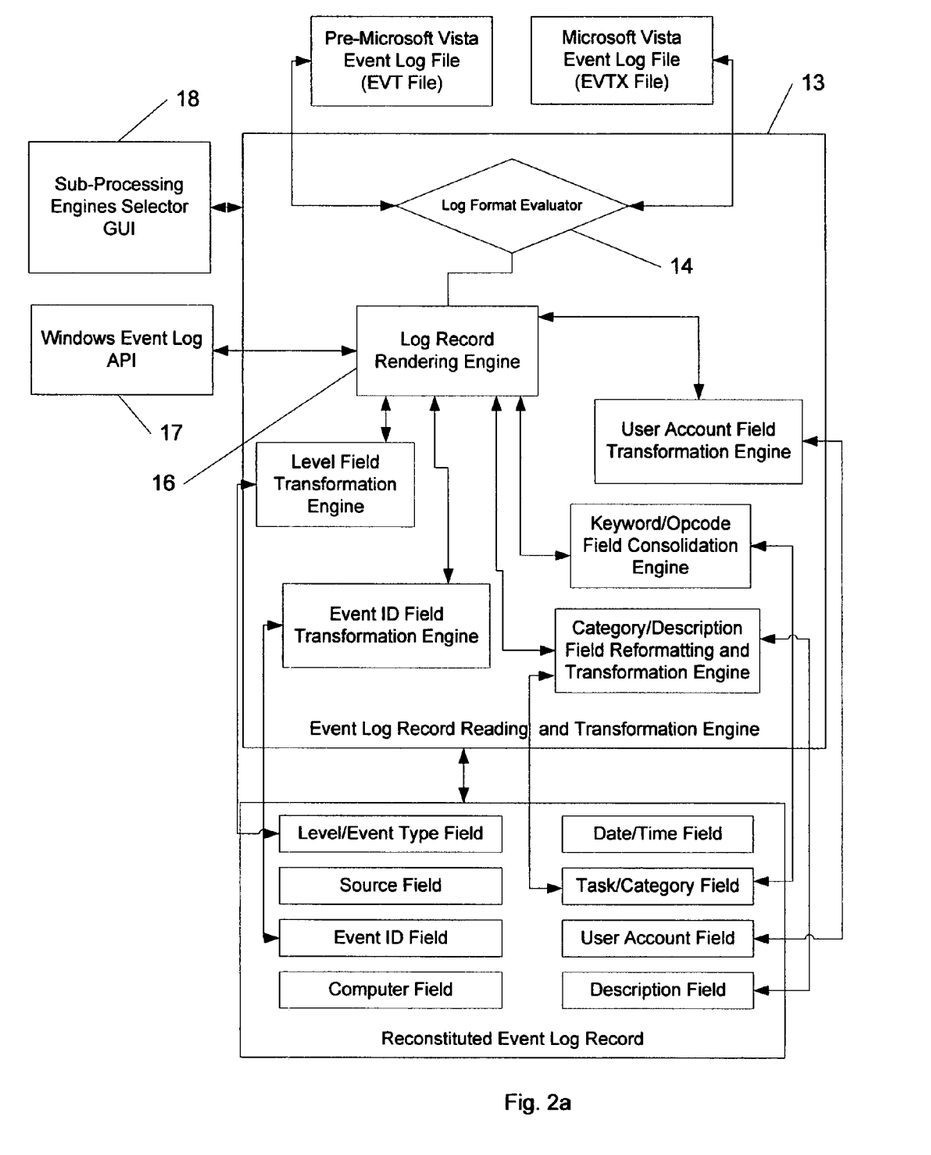
FIG. 2a illustrates a top-level block diagram view of an Event Log Record Reading and Transformation Engine.
Figure 2B:
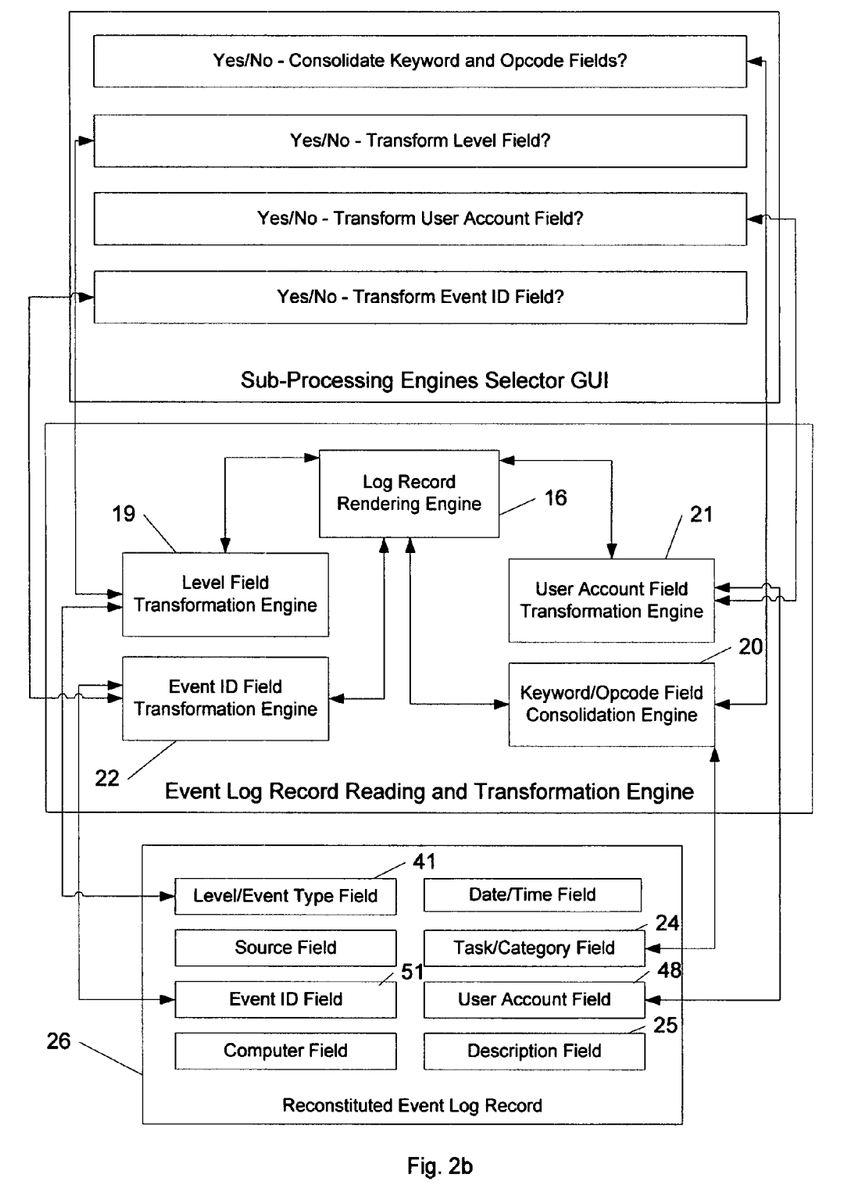
FIG. 2b illustrates a top-level block diagram view of an Event Log Record Reading and Transformation Engine in communication with a Reconstituted Event Log Record.

Based on direction from the calling program or user, the Event Log Record Reading and Transformation Engine 13, FIG. 1 directs the Log Record Rendering Engine 16, FIG. 2b to render the fields present in the current event log record. The Log Record Rendering Engine 16 in turn passes information on the data and fields of the log record it wishes to render to the Windows Event Log API 17, and then receives rendered event data and fields back from the Windows Event Log API.

Once it has successfully rendered key event log data and fields for the current log record, the Log Record Rendering Engine 16 passes that data back to the Event Log Reading and Transformation Engine 13 for further processing in one or more field transformation and consolidation sub-engines, which are discussed in detail below. The actual sub-engines used to process the rendered event log data and fields are determined primarily by the format (e.g. EVT or EVTX) of the target event log, but the use of some sub engines can be directly controlled by the user or calling program. The user can use the Sub-Processing Engines Selector GUI 18, FIG. 2a to control which sub-engines the Event Log Record Reading and Transformation Engine 13 uses to further consolidate and transform log fields from EVTX format log files. Specifically, the user can select whether or not the Event Log Record Reading and Transformation Engine 13 loads and executes the Level Field Transformation Engine 19, the Keyword/Opcode Field Consolidation Engine 20, the User Account Field Transformation Engine 21, and/or the Event ID Field Transformation Engine 22, FIG. 2b. The selections made by the user in the Sub-Processing Engines Selector GUI are persisted on disk and in memory as to be accessible to the Event Log Record Reading and Transformation Engine 13.

Figure 3A:
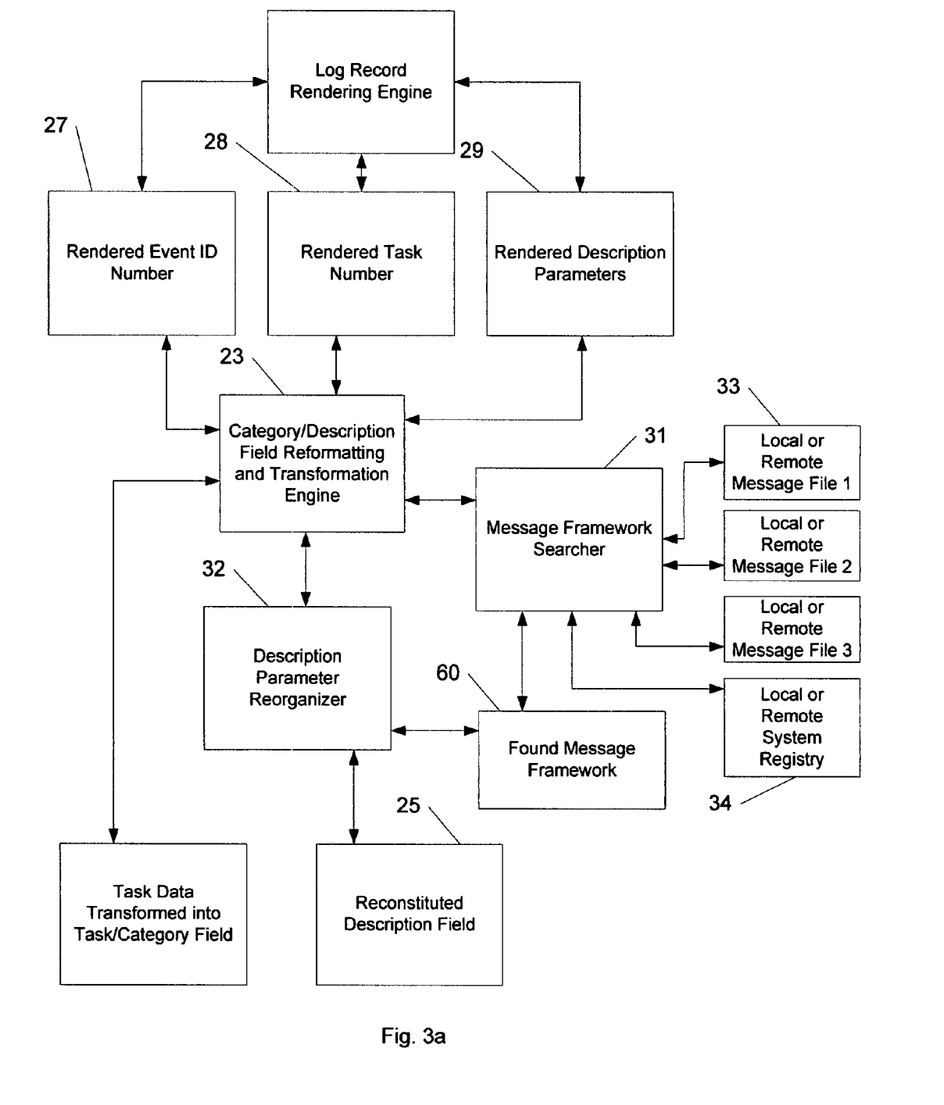
FIG. 3a illustrates a top-level block diagram view of a Category/Description Fields Reformatting and Transformation Engine.

If the target event log is determined to be in the EVT format the Event Log Reading and Transformation Engine 13, FIG. 1 uses the Category/Description Field Reformatting and Transformation Engine 23, FIG. 3a to prepare both the Task/Category Field 24 and Reconstituted Description Field 25 in the Reconstituted Event Log Record 26. Specifically, it passes the Rendered Event ID Number 27, the Rendered Task Number 28 and the Rendered Description Parameters 29 it previously received from the Log Record Rendering Engine 16 to the Category/Description Field Reformatting and Transformation Engine 23.

Once the Category/Description Field Reformatting and Transformation Engine 23, FIG. 3a receives these three sets of rendered data, it uses the Message Framework Searcher 31 and the Description Parameter Reorganizer 32 to prepare the Task/Category 24 and Reconstituted Description Field 25.

When reconstituting the Task/Category field 24, FIG. 2b, only the Message Framework Searcher 31, FIG. 3a is used to obtain this information. Specifically, the Message Framework Searcher 31 queries the Local or Remote System Registry 34 to locate the Local or Remote Message files that contain the Category Message corresponding to the Rendered Task Number. Once the Category Message is obtained from the Local or Remote Message File, this message then becomes the reconstituted Task/Category Field 24.

Figure 3B:
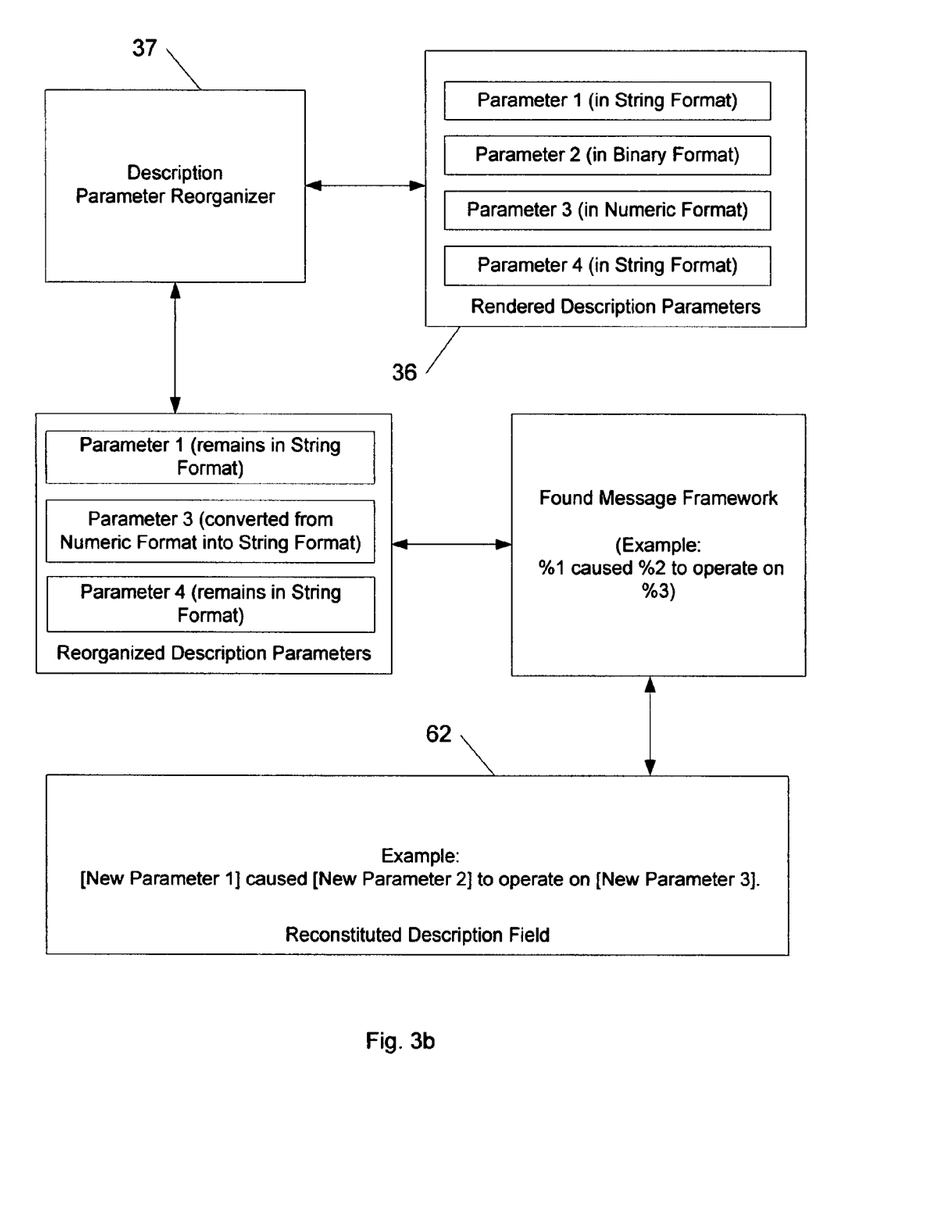
FIG. 3b illustrates a top-level block diagram view of a Description Parameter Reorganizer.

When producing the Reconstituted Description Field 25, FIG. 3a, both the Message Framework Searcher 31, and the Description Parameter Reorganizer 32 are used during this process. When the Category/Description Field Reformatting and Transformation Engine 23 receives the Rendered Description Parameters 36 from the Log Record Rendering Engine 16, it examines both the total number of parameters present, and the data type of each parameter (e.g. Parameter 1 in string format, Parameter 2 in a raw binary format, Parameter 3 in a numeric format, and Parameter 4 in a string format). When examined in depth by the Category/Description Field Reformatting and Transformation Engine 23, some of the Rendered Description Parameters 36 may be in non-string data types (e.g. Parameter 2 and Parameter 3). Also, the total of the Rendered Description Parameters 29 may be more than can fit within the Found Message Framework 60. To overcome this, the Category/Description Field Reformatting and Transformation Engine 23 uses the Description Parameter Reorganizer 32 to restructure the Rendered Description Parameters 29. Specifically, parameters whose data should not be combined with the Found Message Framework are removed, and parameters whose data should be combined with the Found Message Framework 60, but whose data type is in a non-string data type, are then converted into a string data type. Finally, the Description Parameter Reorganizer, 32, FIG. 3b arranges all of the valid parameter data that has been converted to strings into an array of strings, and formats this array of strings with the Found Message Framework obtained by the Message Framework Searcher 31, FIG. 3c to produce the Reconstituted Description Field 25.

Figure 3C:
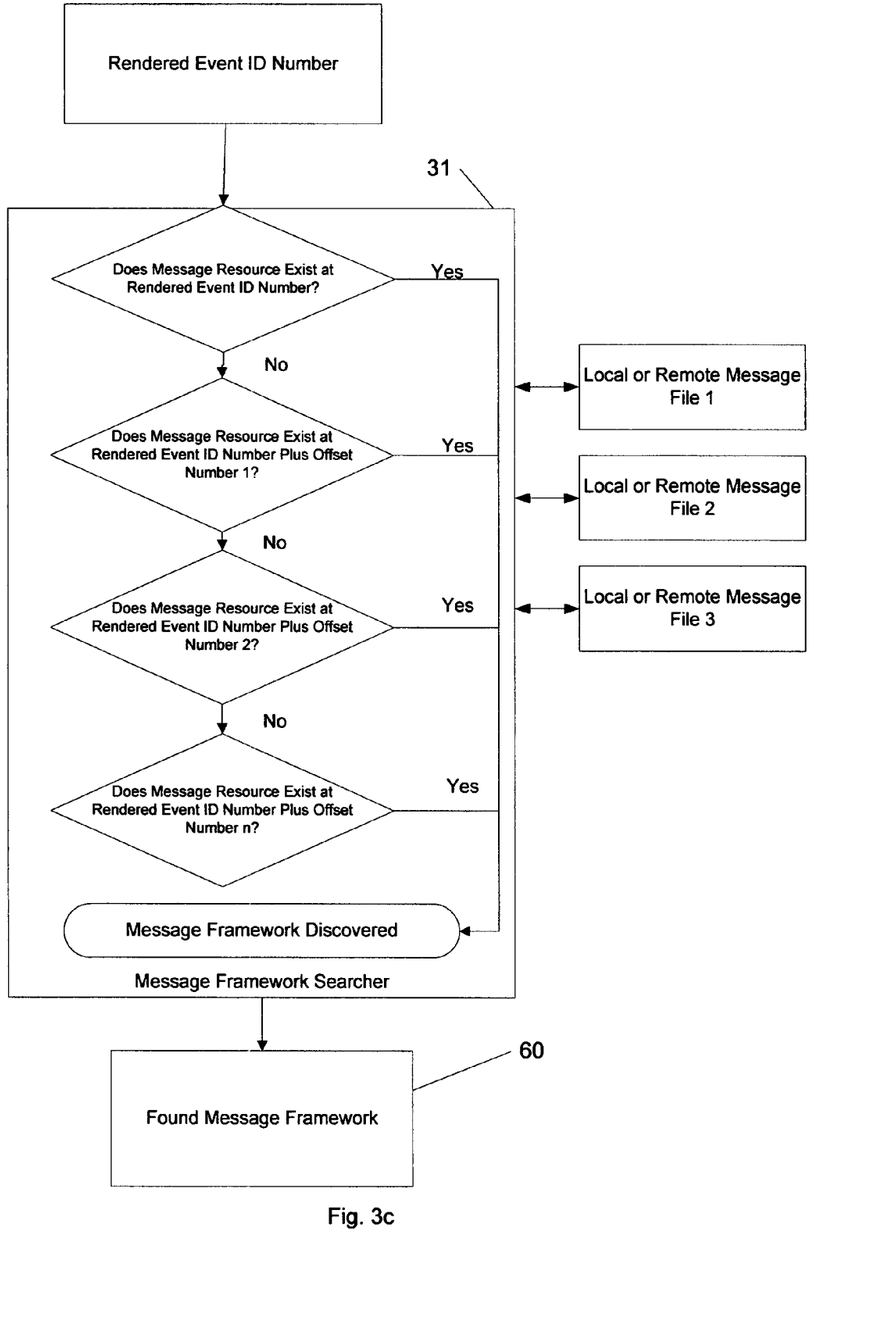
FIG. 3c illustrates a top-level block diagram view of a Message framework searcher.

As outlined above, a Found Message Framework, 60, FIG. 3c must be obtained to produce the Reconstituted Description Field 25. As a result, the Message Framework Searcher 31 must obtain the proper Found Message Framework 60 by querying the Local or Remote System Registry 34 and Local or Remote Message Files 33 (e.g. Local or Remote Message File 1, Local or Remote Message File 2). However, an additional problem must be overcome at this point. The Rendered Event ID Number 27, like the Rendered Task Number 28, is used by the Message Framework Searcher 31 to find the appropriate Found Message Framework 60 for the Reconstituted Description Field 25 in the Local or Remote Message File. Unfortunately, the Rendered Event ID Number 27 may be incorrect and not point to any message resource in the Local or Remote Message Files. In order to find the appropriate Found Message Framework 60, the Message Framework Searcher sequentially applies a series of offset numbers to the Rendered Event ID Number to locate the Found Message Framework 60 in one of the Local or Remote Message Files. This process is analogous to a person who knows the last 7 digits of a 10 digit telephone number, but does not know the area code. Such a person could then dial different area codes in sequence while using the known 7 digit number until they found the party they were trying to reach. Once this Found Message Framework 60 is discovered, it is combined with the array of strings refined by the Description Parameter Reorganizer 32 to produce the Reconstituted Description Field 25.

If the target log in EVTX format is a Security-oriented event log, and if the user or calling program has indicated via the Sub-Processing Engines Selector GUI 18 FIG. 2a to perform a transformation on Rendered Level Data, the Event Log Reading and Transformation Engine 13 uses the Level Field Transformation Engine 19 to properly prepare the Level/Event Type Field 41 in the Reconstituted Event Log Record 26. Specifically, it passes the Rendered Level Data 42 and the Rendered Keyword Data 43 it previously received from the Log Record Rendering Engine 16 to the Level Field Transformation Engine 19.

Figure 4A:
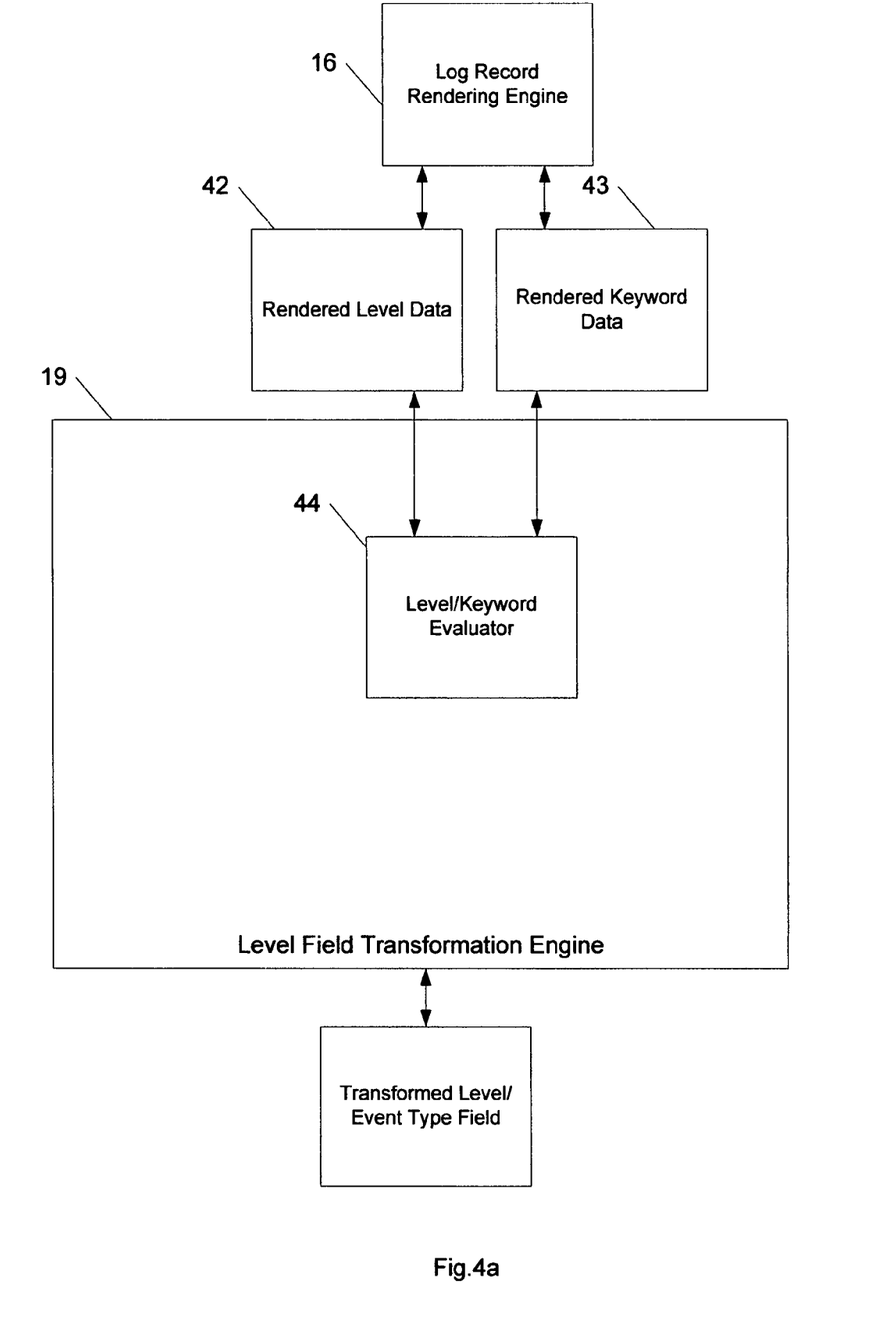
FIG. 4a illustrates a top-level block diagram view of a Level Field Transformation Engine.
Figure 4B:
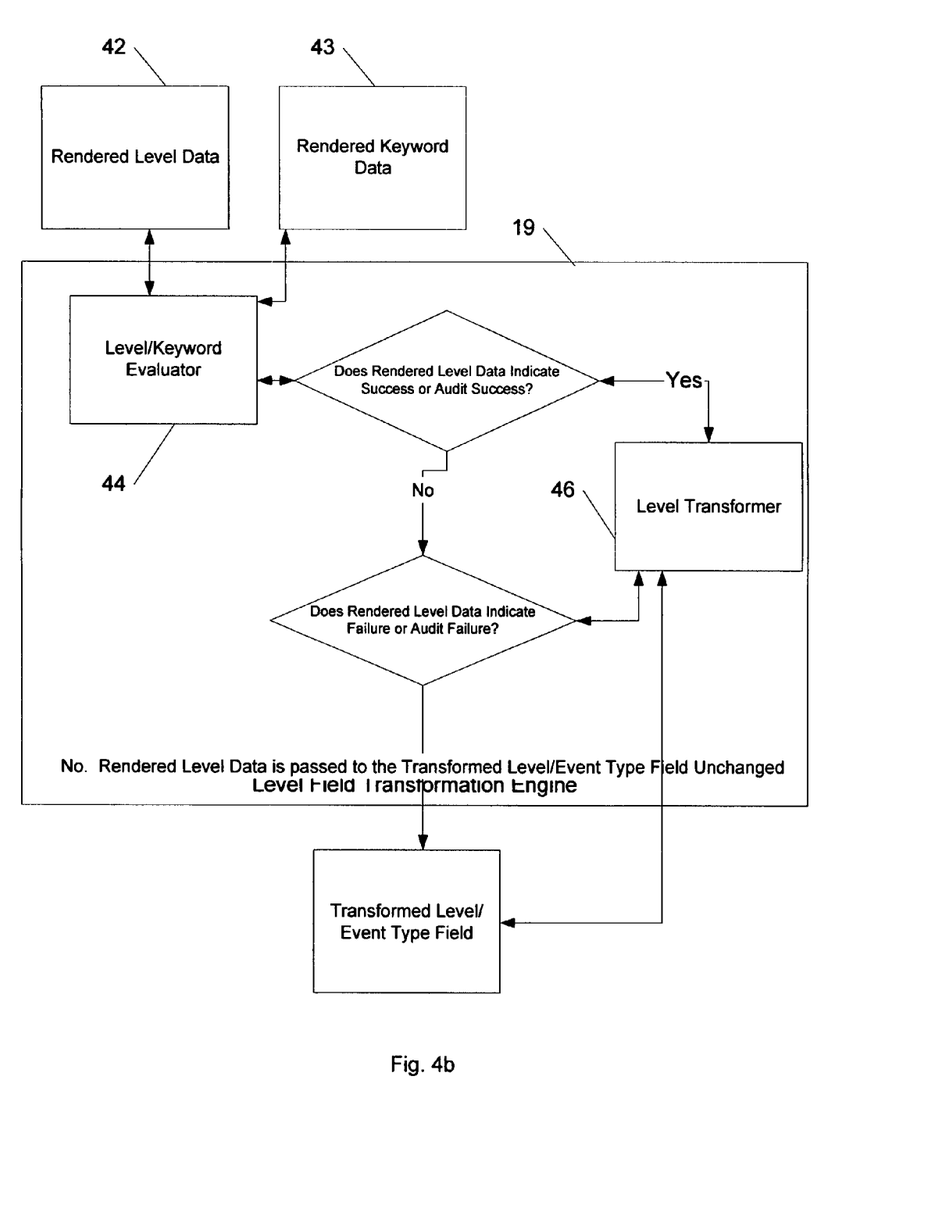
FIG. 4b illustrates a top-level block diagram view of a Level Field Transformation Engine in communication with a Transformed Level/Event Type Field.

Once the Level Field Transformation Engine 19 FIG. 2b receives these two sets of rendered data, it uses the Level/Keyword Evaluator 44, FIG. 4a to properly transform the Rendered Level Data 42 into a reconstituted Level/Event Type Field 41. Specifically, if the Rendered Keyword Data 43 indicates that the current security log record is related to a failed operation or "Audit Failure," the Level/Keyword Evaluator 44 passes the Rendered Level Data to the Level Transformer 46 which places a string into the Transformed Level/Event Type Field indicating that the event type is a "Failure Audit." Similarly, if the Rendered Keyword Data indicates that the current security log record is related to a successful operation or "Audit Success," the Level/Keyword Evaluator passes the Rendered Level Data to the Level Transformer 46 which places a string into the Transformed Level/Event Type Field indicating that the event type is a "Success Audit." If the Rendered Keyword data matches neither one of the above two conditions, the Rendered Level Data is passed on to the Transformed Level/Event Type field with no changes. Similarly, if the user or calling program has not indicated via the Sub-Processing Engines Selector GUI 18 to perform a transformation on Rendered Level Data 42, the Rendered Level Data is passed on to the Transformed Level/Event Type field unchanged.

Figure 5A:
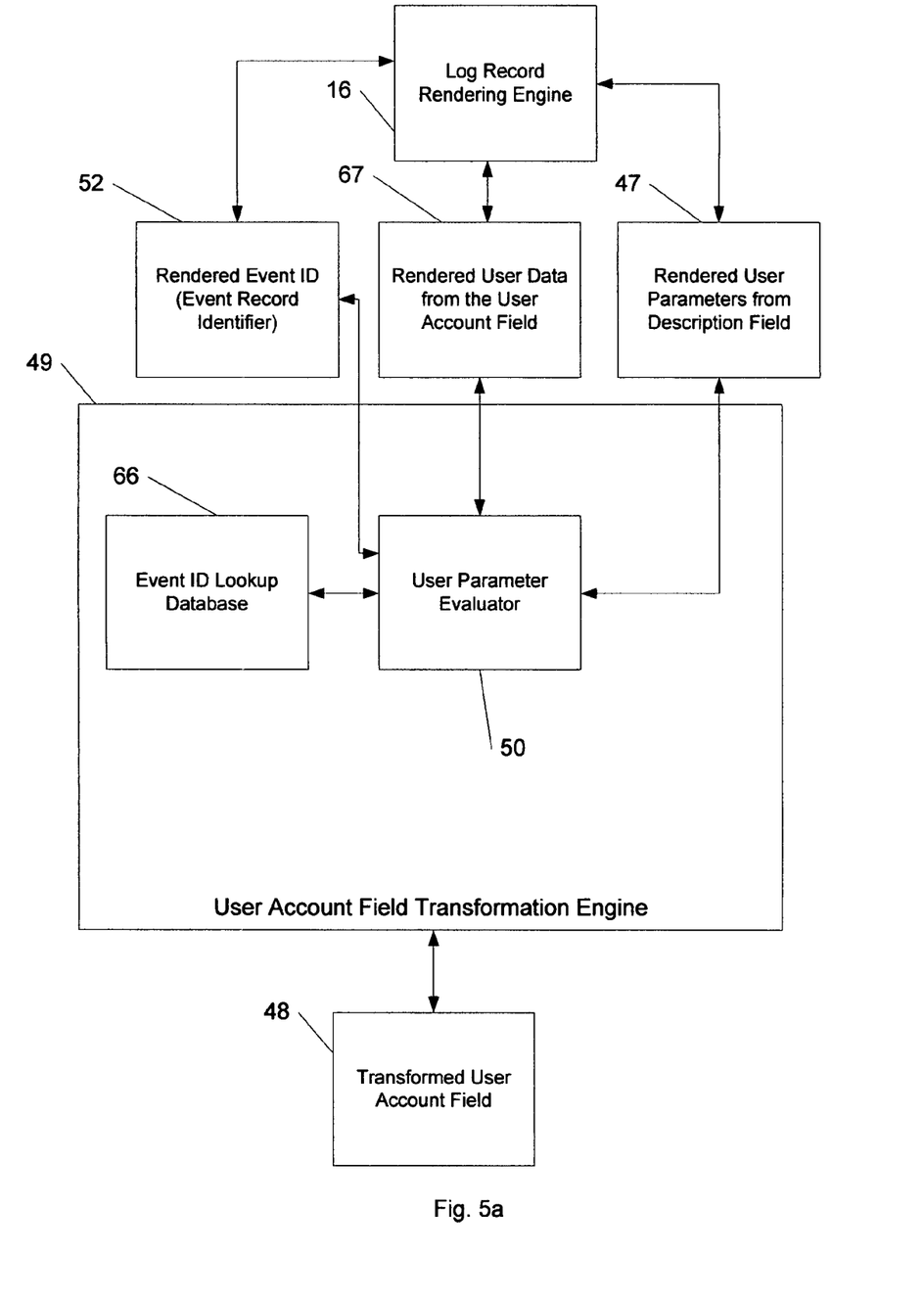
FIG. 5a illustrates a top-level block diagram view of a User Account Field Transformation Engine.
Figure 5B:
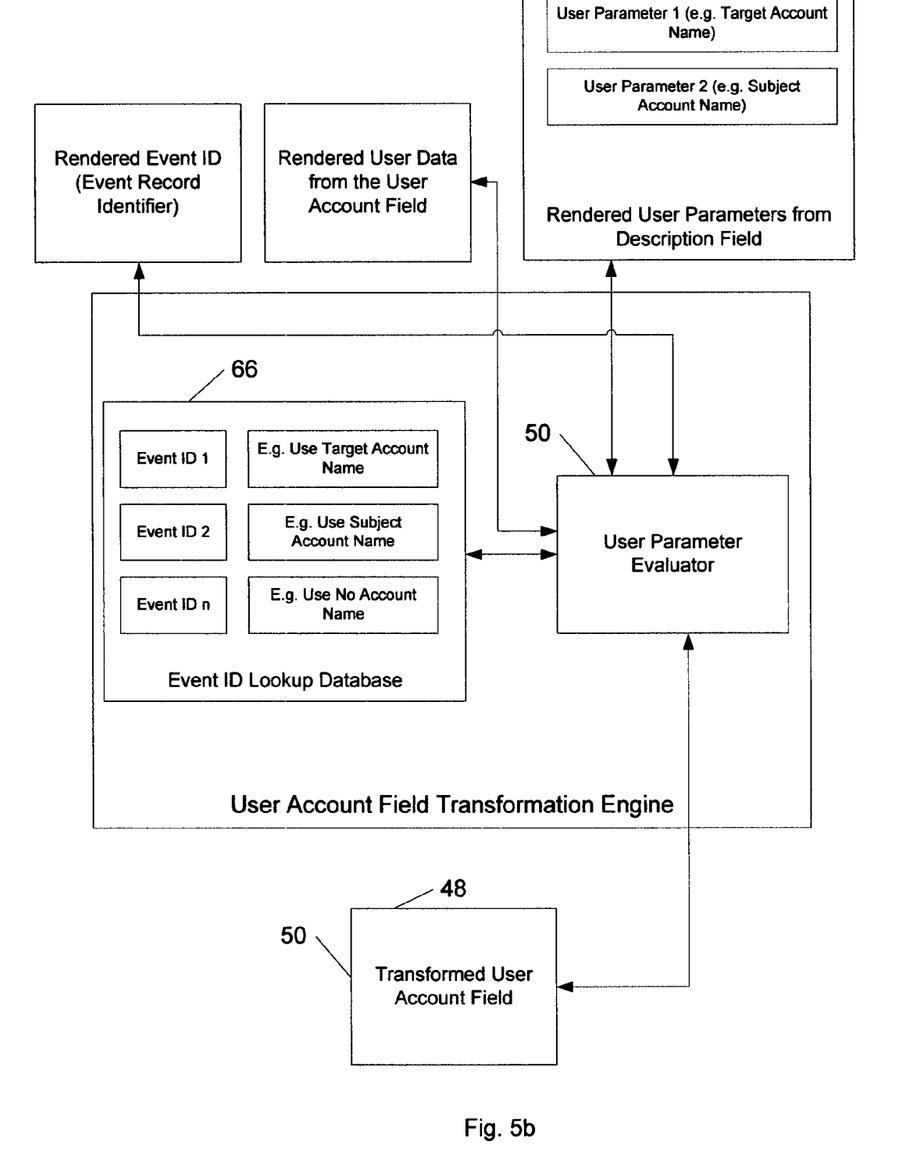
FIG. 5b illustrates a top-level block diagram view of a User Account Field Transformation Engine in communication with a Transformed User Account Field.

If the target log in EVTX format is a Security-oriented event log, and if the user or calling program has indicated via the Sub-Processing Engines Selector GUI 18, FIG. 2a to perform a transformation on the Rendered User Parameters 47, FIG. 5a from the Description Field 25, the Event Log Reading and Transformation Engine 13 uses the User Account Field Transformation Engine to properly prepare the Transformed User Account Field 48 in the Reconstituted Event Log Record. Specifically, it passes: 1.) the Rendered Event Identifier number, 2.) the Rendered User Data from the User Account Field (if any) and 3.) the Rendered User Parameters from the Description Field it previously received from the Log Record Rendering Engine to the User Account Transformation Engine 49.

Once the User Account Field Transformation Engine 49, FIG. 5a receives these three sets of rendered data, it uses the User Parameter Evaluator 50 to transform the Rendered User Parameters from the Description Field into a reconstituted User Account Field 48. Such Rendered User Parameters might include a Subject Account Name that performed the action logged, the Target Account Name that was affected by the action logged, both, or none of the above. The User Parameter Evaluator, using the Rendered Event Identifier number passed to it, consults the Event ID Lookup Database to determine which Rendered User Parameter, if any, should be placed in the Transformed User Account Field. Once this determination is made, the most appropriate Rendered User Parameter is placed into the Transformed User Account Field 48. If there is no corresponding entry in the Event ID Lookup Database, the Rendered User Data from the User Account Field 67 is passed unchanged into the Transformed User Account Field. Likewise, if the user or calling program has not indicated via the Sub-Processing Engines Selector GUI 18 to perform a transformation on the Rendered User Parameters, the Rendered User Data from the User Account Field is passed unchanged on to the Transformed User Account Field.

If the target log in EVTX format is a Security-oriented event log, and if the user or calling program has indicated via the Sub-Processing Engines Selector GUI 18, FIG. 2a to perform a transformation on the Rendered Event ID number, the Event Log Reading and Transformation Engine 13 uses the Event ID Field Transformation Engine 22 to reassign the Transformed Event ID Field in the Reconstituted Event Log Record. Specifically, it passes the Rendered Event Identifier number it previously received from the Log Record Rendering Engine to the Event ID Field Transformation Engine 22.

Figure 6A:
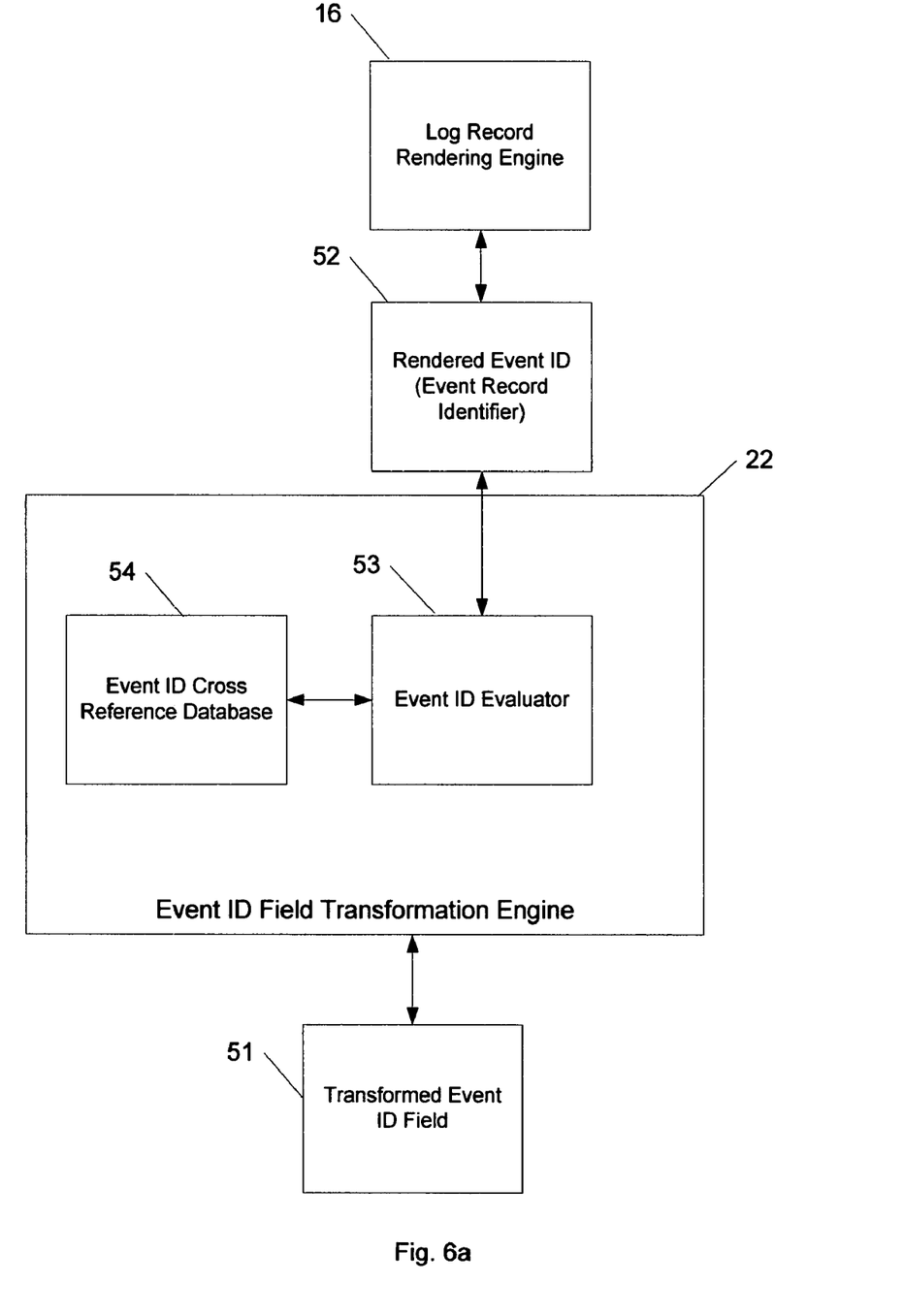
FIG. 6a illustrates a top-level block diagram view of an Event ID Field Transformation Engine.
Figure 6B:
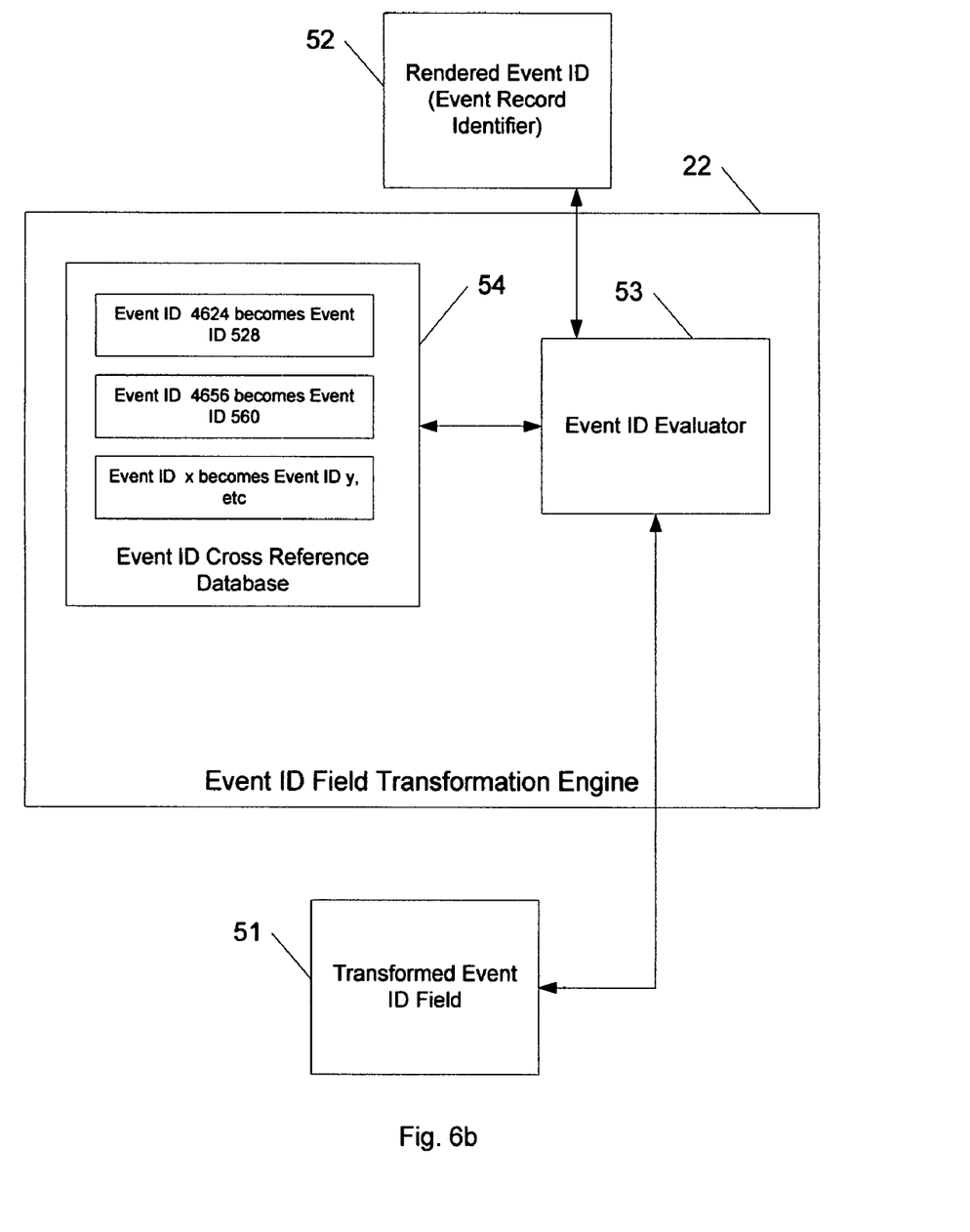
FIG. 6b illustrates a top-level block diagram view of an Event ID Field Transformation Engine in communication with a Transformed Event ID Field.

Once the Event ID Field Transformation Engine 22, FIG. 2a receives the rendered Event ID number, it uses the Event ID Evaluator to transform the Rendered Event ID number 52, FIG. 6a into a Transformed Event ID Field. The Event ID Evaluator 53, using the Rendered Event Identifier number passed to it, consults the Event ID Cross Reference Database 54, FIG. 6b to determine if there is a different Event ID number that should be substituted in place of the rendered Event ID number (e.g. Event ID 528 could be substituted for Event ID 4624). If a corresponding Event ID is found in the Event ID Cross Reference Database 54, the Event ID Evaluator places it into the Transformed Event ID Field. If there is no corresponding entry in the Event ID Cross Reference Database, the Rendered Event Identifier number is passed unchanged into the Transformed Event ID Field Likewise, if the user or calling program has not indicated via the Sub-Processing Engines Selector GUI 18 to perform a transformation on the Rendered Event Identifier number, the Rendered Event Identifier number is passed on to the Transformed Event ID field 51 unchanged.

Figure 7:
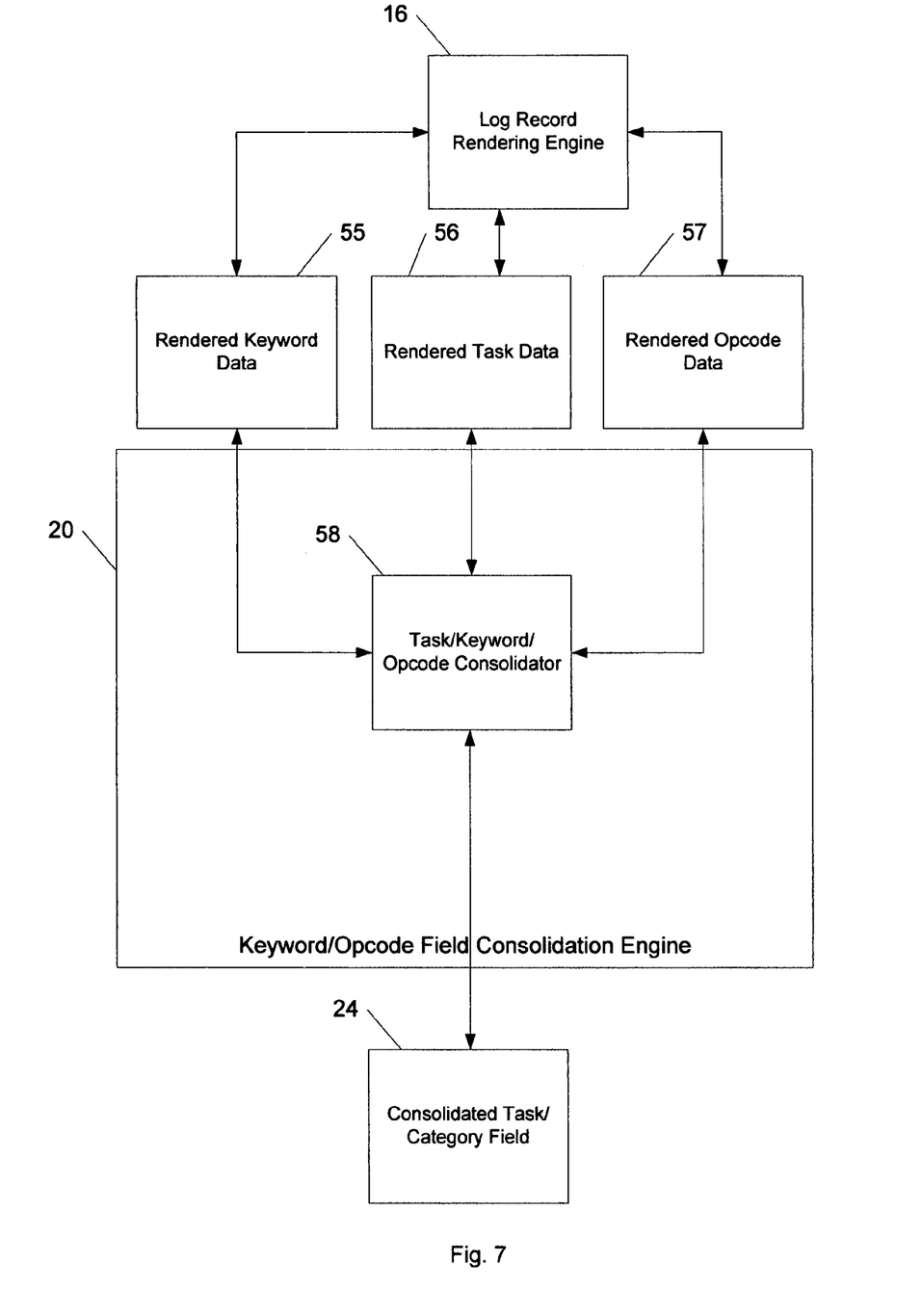
FIG. 7 illustrates a top-level block diagram view of a keyword/Opcode field consolidation Engine.

If the target log is in EVTX format, and if the user or calling program has indicated via the Sub-Processing Engines Selector GUI to consolidate Rendered Keyword Data 55, FIG. 7, Rendered Opcode Data 57 and Rendered Task Data 56 into the Consolidated Task/Category Field 24, the Event Log Reading and Transformation Engine uses the Keyword/Opcode Consolidation Engine 20 to properly prepare the Consolidated Task/Category Field in the Reconstituted Event Log Record. Specifically, it passes: 1.) The Rendered Keyword Data, 2.) the Rendered Opcode Data, and 3.) the Rendered Task Data it previously received from the Log Record Rendering Engine to the Keyword/Opcode Field Consolidation Engine.

Once the Keyword/Opcode Field Consolidation Engine receives the three sets of rendered data mentioned above, it uses the Task/Keyword/Opcode Consolidator 58, FIG. 7 to properly combine all three sets of data into a consolidated Task/Category Field 24. The Task/Keyword/Opcode Consolidator verifies the Rendered Keyword Data, Rendered Opcode Data, and Rendered Task Data are in an selective data format, converts any of the rendered data into an selective data format if it is not already in that format, and then combines all three data sets into a single Consolidated Task/Category Field. If the user or calling program has not indicated via the Sub-Processing Engines Selector GUI to perform a consolidation of the Rendered Keyword Data, Rendered Opcode Data, and Rendered Task Data, only the Rendered Task Data is passed on to the Consolidated Task/Category field, omitting any Rendered Keyword or Opcode data.

Once all selective sub-engines have executed, the Event Log Record Reading and Transformation Engine 13, FIG. 1 aggregates all the log record fields, including those fields that have been transformed/combined, and those fields that have not been transformed, and then can 1.) pass them back to the calling program, 2.) display them directly to the user on screen, or 3.) export them directly to another format, such as a text file, XML file, HTML file, database table, etc, depending on how it has been configured. At this point, the Event Log Record Reading and Transformation Engine, at the direction of the user or calling program, can process the next event log record in the target event log, or can terminate execution and unload all data structures from memory.

I claim:

1. A computer-implemented method of translating an event record of an event log into a reconstituted event record, the method comprising acts of:
    rendering data contained in the event record into at least one data set;
    transforming, on a computer having at least one transformation engine, the at least one data set into at least one transformed data set using the at least one transformation engine including:
        a security level transformation engine,
        a user account transformation engine,
        a keyword/opcode transformation engine,
        a category/description transformation engine, and
        an event identifier transformation engine; and
    generating the reconstituted event record from the at least one transformed data set, the reconstituted event record comprising the data contained in the event record in a format that is common to a pre-MICROSOFT WINDOWS® VISTA operating system event log and a MICROSOFT WINDOWS® VISTA operating system event log, such that the reconstituted event record can be managed on a computer executing any version of the MICROSOFT WINDOWS® operating system prior to and including the MICROSOFT WINDOWS® VISTA operating system;
    wherein the category/description transformation engine is operable to query, based on information in the at least one data set, a system registry to locate a message file containing a category message corresponding to a task number associated with the event record; and
    wherein the category/description transformation engine is further operable to locate the message file by sequentially applying a series of offset numbers to an event identifier in the event record.

2. The method of claim 1, wherein the reconstituted event record comprises a security level/event type field, an event identifier field, a task/category field, a user account field, and a description field.

3. The method of claim 1, wherein the at least one transformation engine used in the transforming act is selected by a user.

4. The method of claim 1, wherein the at least one transformation engine used in the transforming act is selected based on a file type of the event log, the file type comprising one of an EVT file and an EVTX file.

5. The method of claim 1, wherein the security level transformation engine is operable to determine, in the at least one data set, whether the event record includes a security audit event, and responsive to determining that the event record includes the security audit event generating a string containing a security audit event type including one of "Failure Audit" and "Success Audit."

6. The method of claim 1, wherein the user account transformation engine is operable to identify, in the at least one data set, a user parameter corresponding with the event record, and to determine whether the user parameter is to be placed into the at least one transformed data set by comparing an event identifier associated with the event record to data in an event identification database.

7. The method of claim 1, wherein the keyword/opcode transformation engine is operable to determine, in the at least one data set, whether at least one of a keyword field, an opcode field, and a task data field are in a particular data format, and responsive to determining that the at least one of the keyword field, the opcode field, and the task data field are not in the particular data format, converting the at least one of the keyword field, the opcode field, and the task data field into the particular data format.

8. The method of claim 1, wherein the category/description transformation engine is further operable to convert a description parameter in the at least one data set into a string.

9. The method of claim 1, wherein the event identifier transformation engine is operable to transform an event identifier in the at least one data set into a transformed event identifier based on information contained in an event identifier cross-reference database.

10. The method of claim 1, further comprising returning the reconstituted event record to an event log manager executing on the computer.

* * * * *